United States Patent
Suwada

(10) Patent No.: US 8,422,567 B2
(45) Date of Patent: Apr. 16, 2013

(54) SIGNAL TRANSMISSION APPARATUS AND METHOD

(75) Inventor: Makoto Suwada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 401 days.

(21) Appl. No.: 12/689,727

(22) Filed: Jan. 19, 2010

(65) Prior Publication Data

US 2010/0118930 A1   May 13, 2010

Related U.S. Application Data

(63) Continuation of application No. PCT/JP2007/064325, filed on Jul. 20, 2007.

(51) Int. Cl.
*H04B 3/00* (2006.01)
*H04L 25/00* (2006.01)

(52) U.S. Cl.
USPC ........... 375/257; 375/220; 375/224; 375/226; 375/227; 375/232; 333/18; 702/104; 714/704

(58) Field of Classification Search .................. 375/220, 375/224, 226, 227, 232, 257; 333/18; 702/104; 714/704
See application file for complete search history.

(56) References Cited

U.S. PATENT DOCUMENTS

| | | | |
|---|---|---|---|
| 6,016,379 A * | 1/2000 | Bulow | 385/147 |
| 6,925,430 B2 * | 8/2005 | Suwada et al. | 703/15 |
| 7,505,512 B1 * | 3/2009 | Anderson et al. | 375/229 |
| 8,103,469 B1 * | 1/2012 | Wong et al. | 702/66 |
| 2003/0173978 A1 * | 9/2003 | Adamian et al. | 324/638 |
| 2004/0041652 A1 * | 3/2004 | Takahashi | 333/28 R |
| 2004/0227580 A1 * | 11/2004 | Otsuka et al. | 333/4 |
| 2004/0268190 A1 * | 12/2004 | Kossel et al. | 714/704 |
| 2005/0028117 A1 * | 2/2005 | Yokoyama et al. | 716/4 |
| 2006/0204245 A1 * | 9/2006 | Tanabe | 398/95 |

(Continued)

FOREIGN PATENT DOCUMENTS

| | | |
|---|---|---|
| JP | 2004-356780 A | 12/2004 |
| JP | 2005-347916 A | 12/2005 |
| JP | 2007-053648 A | 3/2007 |

OTHER PUBLICATIONS

Notification of Transmittal of Translation of the International Preliminary Report on Patentability (Form PCT/IB/338) of International Application No. PCT/JP2007/064325 mailed Feb. 18, 2010 with Forms PCT/IB/326, PCT/IB/373, and PCT/ISA/237.

(Continued)

*Primary Examiner* — Shuwang Liu
*Assistant Examiner* — Sung Ahn
(74) *Attorney, Agent, or Firm* — Westerman, Hattori, Daniels & Adrian, LLP

(57) ABSTRACT

According to an aspect of the embodiment, a signal transmission apparatus includes a sine wave output unit that outputs a sine wave to a transmission path, network analyzers and that analyze signals on the transmission path, an S parameter measurement unit that measures S parameters based on the analysis, a selection unit that selects a plurality of combinations of an amplitude, an emphasis characteristic, and an equalization characteristic based on the S parameters, measurement units that measure a BER or an eye opening of the transmission path for the plurality of combinations, and a setting unit that extracts single combination based on the measurement and that sets the amplitude, the emphasis characteristic, and the equalization characteristic to a transmission unit and a reception unit.

13 Claims, 10 Drawing Sheets

U.S. PATENT DOCUMENTS

2007/0041454 A1  2/2007  Yamazaki
2007/0236305 A1* 10/2007  Kearns et al. .................... 333/12
2008/0285453 A1* 11/2008  Connolly et al. ............. 370/235

OTHER PUBLICATIONS

Bereza, W et al, "PELE: Pre-emphasis & Equalization Link Estimator to Address the Effects of Signal Integrity Limitations", 43rd ACM/IEEE Design Automation Conference, Jun. 2006, pp. 1013-1016.

Sawyer, S et al, "Digital and microwave worlds converge in 10-Gbps backplane design and test", EDN, Mar. 30, 2006, No. 7, pp. 63-70.
Turudic, A, "Abracadabra: Making System Interconnect Disappear with FPGAs", EDN, Sep. 14, 2006, No. 19, pp. 59-68.
International Search Report of PCT/JP2007/064325, mailing date of Oct. 30, 2007.
Chinese Office Action dated Nov. 5, 2012, issued in corresponding Chinese Patent Application No. 200780053829.6, (7 pages), with Partial English Translation.

* cited by examiner

SIGNAL TRANSMISSION APPARATUS AND METHOD

CROSS-REFERENCE TO RELATED APPLICATIONS

This is a continuation application of PCT application Ser. No. PCT/JP2007/064325, filed on Jul. 20, 2007.

FIELD

The embodiments discussed herein are related to a signal transmission apparatus and a method.

BACKGROUND

An electrical interface in an electronic device, such as a personal computer and a server, is now shifting from a parallel interface to a serial interface. In the serial interface, a stable transmission waveform is needed for using a high-frequency band. Therefore, it is needed to appropriately detect transmission path loss, jitter, noise, and characteristic variations (production variations) caused by production etc., and to control a communication circuit based on the detection.

A pulse discrimination degradation detection system is proposed in which a communication apparatus detects a state of degrading factors related to an occurrence of a code error, and transmits the state to an opposing communication apparatus to thereby detect the degrading factors in a remote location (refer to Patent Document 1).

A transmission signal equalization system is also proposed in which a reception circuit detects an equalization characteristic based on a reception signal that has passed through a reception path, and calculates a difference between the equalization characteristic and an optimal equalization characteristic, and in which a transmission circuit controls the equalization characteristic based on the difference (refer to Patent Document 2).

Patent Document 1 Japanese Laid-Open Patent Publication No. 64-016048 Patent Document 2 Japanese Laid-Open Patent Publication No. 2004-356780

As illustrated in FIG. 10, an electrical interface includes, for example, a transmission LSI 102 that transmits a signal (waveform), a transmission path which is formed by a printed circuit board 101 and a connector (or cable) 106, and a reception LSI 102 that receives a signal. In designing such the electrical interface, it is needed for obtaining optimal transmission quality to take into consideration performance of transmission and reception (a transmission unit 103 and a reception unit 104), characteristic variations of elements and materials, characteristics of elements which form the transmission path, noise, etc. In this case, examples of items is to be taken into consideration include, for example, transmission performance; reception performance; production variations in LSI, materials, and characteristics; power supply noise; crosstalk noise; reflection; and signal loss at wires and connection parts of printed circuit board, cables, connectors, and transmission LSI and reception LSI.

The loss and the jitter can be obtained by calculation. Further, a model is created in advance which takes the elements, noise, production variations, etc. into consideration, and pre-analysis of the transmission waveform is performed by setting an amplitude, an emphasis characteristic (emphasis), and the equalization characteristic to various values using the model. Based on the calculation or the pre-analysis, the electronic device is designed so that the loss and the jitter do not exceed determined values. Subsequently, in an evaluation of the electronic device, the amplitude, the emphasis characteristic, and the equalization characteristic are manually set to obtain an optimal transmission waveform or optimal transmission quality. As a result, the optimal amplitude, optimal emphasis characteristic, and optimal equalization characteristic can be obtained for the electronic device, and these obtained values can be set to the electronic device.

However, in mass-produced electronic devices (mass production devices), influence of the production variations is more apparent than in prototype electronic devices. More specifically, characteristics of the mass production devices are different device by device, and cannot be uniformly optimized. Therefore, the amplitude, the emphasis characteristic, and the equalization characteristic obtained by evaluating the electronic device before the mass production are not necessarily optimal. Furthermore, there are many factors of the production variations, so that it is significantly difficult to take all factors into consideration to optimize the amplitude, the emphasis characteristic, and the equalization characteristic of the transmission LSI and reception LSI.

Therefore, in practice, the amplitude, it is needed to set the emphasis characteristic, and the equalization characteristic for each mass production device in a test of the mass production devices at shipping time. As a result, enormous man-hours are required to ship the mass production devices.

SUMMARY

According to an aspect of the embodiment, a signal transmission apparatus includes a transmission unit transmitting a signal, and including transmission signal control means for controlling an amplitude of the signal and an emphasis characteristic of the signal; a reception unit receiving the signal, and including reception signal equalizing means for controlling an equalization characteristic of the signal; a transmission path connecting the transmission unit and the reception unit, and transmitting the signal; a signal output unit outputting the signal to the transmission path; a network analyzer analyzing the signal on the transmission path in a state that the reception signal equalizing means is cut off from the reception unit; a frequency characteristic measurement unit measuring frequency characteristics of the transmission path based on the analysis by the network analyzer; a selection unit selecting a plurality of combinations of amplitude, emphasis characteristic, and equalization characteristic based on the frequency characteristics; a measurement unit measuring at least one of a BER (bit error rate) and an eye opening of the transmission path for the plurality of combinations; and a setting unit extracting single combination from the plurality of combinations based on the measurement of the BER or the eye opening, and setting the extracted amplitude, the extracted emphasis characteristic, and the extracted equalization characteristic to the transmission unit and the reception unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
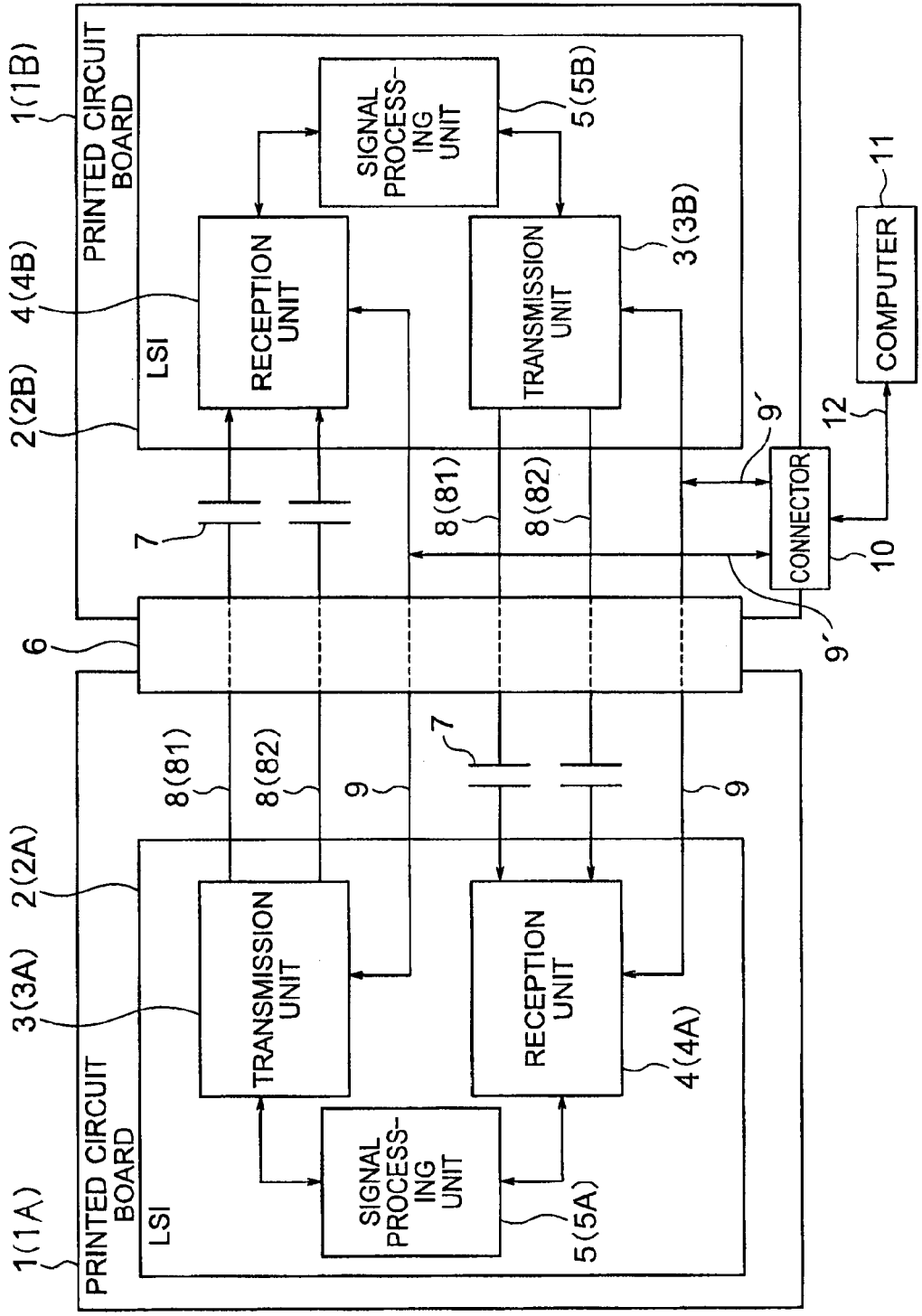
FIG. 1 is a block diagram illustrating an example of a signal transmission apparatus of the present embodiment.

The present embodiment provides a signal transmission apparatus with optimized circuit characteristics in a transmission and reception circuit that performs a high-speed serial transmission, in which loss and jitter of transmitted signals are problems.

The present embodiment provides a signal transmission method with optimized circuit characteristics in a transmission and reception circuit that performs a high-speed serial transmission, in which loss and jitter of transmitted signals are problems.

In the present embodiment, the signal transmission apparatus may further include a control unit cutting off the reception signal equalizing means from the reception unit before the analyzing of the signal by the network analyzer.

In the present embodiment, the measurement unit may further include a BER measurement unit measuring the BER of the transmission path, and an eye opening measurement unit measuring the eye opening of the transmission path. And, the setting unit may extract the single combination from the plurality of combinations based on the measurement of the BER and the eye opening.

In the present embodiment, the selection unit may select one or more amplitudes satisfying a selection condition that is determined based on the frequency characteristics, may select one or more equalization characteristics having a frequency band that is determined based on the frequency characteristics, and may select a center value and a plurality of values above and below the center value of the selected equalization characteristic as the equalization characteristic. And, the measurement unit may measure the BER and the eye opening for the combinations of the selected one or more amplitudes and the selected one or more equalization characteristics.

In the present embodiment, the determined selection condition may be a condition that is defined using Differential Return Loss Scattering parameters (SDD11 parameters) defined in a model of the S parameters as the frequency characteristics. The determined frequency band may be a frequency lower than upper limit value of SDD11 parameters in the model of the S parameters. The selection unit may select the one or more amplitudes based on the plurality of prepared possible amplitudes of the signal and the prepared possible eye openings of the signal in addition to the S parameters. The measurement unit may measure the BER for the combinations of the selected one or more amplitudes and the selected one or more equalization characteristics, and may measure the eye opening for the one or more combinations having the BER lower than the determined value among the combinations based on the measurement of the BER. And, the setting unit may extract the single combination having the largest eye opening from the plurality of combinations based on the measurement of the eye opening.

In the present embodiment, the signal output unit may include a sine wave output unit that is provided in the transmission unit and outputs sine wave. The measurement unit may be provided in the reception unit. The network analyzer may include a first network analyzer provided in the transmission unit and a second network analyzer provided in the reception unit. And, the frequency characteristic measurement unit may measure the S parameters as the frequency characteristics based on the analysis by the first network analyzer and second network analyzer.

In the present embodiment, the transmission unit may be provided in a first LSI, the reception unit may be provided in a second LSI that is different from the first LSI, and the transmission path may include wires on a substrate mounted with the first LSI and second LSI.

In the present embodiment, the transmission unit may be provided in first LSI, the reception unit may be provided in second LSI that is different from the first LSI, the first LSI may be mounted on first substrate, the second LSI may be mounted on second substrate that is different from the first substrate, the first substrate and the second substrate may be connected by a connector, and the transmission path may include the connector and wires on the first substrate and second substrate.

In the present embodiment, the signal transmission apparatus may further includes a bus provided between the transmission unit and the reception unit to communicate bidirectionally; and a controller connected to the bus, and comprising the frequency characteristic measurement unit, the selection unit, and the setting unit.

According to another aspect of the embodiment, a signal transmission method may executed in a signal transmission apparatus including a transmission unit transmitting a sign comprising transmission signal control means for controlling an amplitude of the signal and an emphasis characteristic of the signal; a reception unit receiving the signal and comprising reception signal equalizing means for controlling an equalization characteristic of the signal; and a transmission path connecting the transmission unit and the reception unit and transmitting the signal. The method may include outputting the signal from a signal output unit to the transmission path; analyzing, at a network analyzer analyzing the signal on the transmission path, transmission and reception of the signal in the transmission path; measuring, at a frequency characteristic measurement unit, frequency characteristics of the transmission path based on the analysis; selecting, at a selection unit, a plurality of combinations of amplitude, emphasis characteristic, and equalization characteristic of the signal based on the frequency characteristics; measuring, at a measurement unit, at least one of a BER and an eye opening of the transmission path for the plurality of combinations; and extracting, at a setting unit, single combination from the plurality of combinations based on the measurement of the BER or the eye opening, and setting the amplitude, the emphasis characteristic, and the equalization characteristic to the transmission unit and the reception unit.

According to the signal transmission apparatus and the signal transmission method of the present embodiment, a signal (for example, a sine wave) is outputted to a transmission path. As a result, frequency characteristics (for example, S parameters) indicating the transmission characteristics of the transmission path can be actually measured. Based on the measured frequency characteristics, a plurality of combinations of amplitude, emphasis characteristic, and equalization characteristic are selected. As a result, a plurality of combinations can be efficiently selected which is expected to include an optimal solution. Furthermore, a BER or an eye opening, which indicate the transmission quality of the transmission path, is actually measured for the plurality of combinations, and based on the measured BER or eye opening, the single combination is extracted from the plurality of combinations. As a result, the single combination having the best actual transmission quality can be extracted to set the amplitude, the emphasis characteristic, and the equalization characteristic.

Therefore, based on the calculation or pre-analysis of the loss and the jitter, the amplitude, the emphasis characteristic, and the equalization characteristic of a signal transmitted in an electronic device can be set based on the actual measurement without a manual operation. As a result, an optimal amplitude, emphasis characteristic, and equalization characteristic can be set, and an optimal transmission waveform or transmission quality can be obtained.

According to the present embodiment, reception signal equalization means (for example, an equalizer) is cut off from a reception unit before analysis of a signal by a network analyzer. As a result, it is possible to accurately analyze frequency characteristics (for example S parameters), such as transmission characteristics and reflection characteristics, of a signal transmitted through a transmission path.

According to the present embodiment, both the BER and the eye opening of the transmission path are measured, and the single combination is extracted based on the result of the measurement of the BER and the eye opening. As a result, the single combination having the best actual transmission quality can be efficiently and accurately extracted.

According to the present embodiment, one or more amplitudes and one or more equalization characteristics are selected based on the frequency characteristics, a plurality of equalization characteristics are selected for the selected equalization characteristic, and both the BER and the eye opening are measured for the combinations of the selected amplitudes and the equalization characteristics. Therefore, based on the frequency characteristics, a plurality of combinations can be efficiently selected which is expected to include an optimal solution. And, as a result, the single combination having the best transmission quality can be efficiently extracted.

According to the present embodiment, SDD11 parameters defined by a model of S parameters as the frequency characteristics are used to select the combination of the amplitude and the equalization characteristic, and the amplitude is selected based on a plurality of prepared amplitudes and eye openings in addition to the S parameters. As a result, a plurality of combinations can be efficiently selected which is expected to include an optimal solution. The eye openings can be measured for the plurality of combinations based on the result of the measurement of the BER. As a result, the eye openings can be efficiently measured. Based on the result of the measurement of the eye openings, it is possible to extract the single combination, which has the largest eye opening, of the amplitude, the emphasis characteristic, and the equalization characteristic. Therefore, optimal amplitude, optimal emphasis characteristic, and optimal equalization characteristic can be set. As a result, the single combination having the best actual transmission quality can be efficiently extracted.

According to the present embodiment, a sine wave output unit as a signal output unit is provided in a transmission unit, a measurement unit is provided in a reception unit, and network analyzers are provided in the transmission unit and the reception unit. As a result, a sine wave can be outputted in directions of actual transmission to measure the frequency characteristics, and measure the BER and the eye opening.

According to the present embodiment, the transmission unit is provided in a first LSI, and the reception unit is provided in a second LSI. As a result, optimal amplitude, optimal emphasis characteristic, and optimal equalization characteristic can be set for the transmission of a signal between different LSIs, and optimal transmission waveform and optimal transmission quality can be obtained.

According to the present embodiment, the transmission unit is provided in the first LSI mounted on a first substrate, and the reception unit is provided in the second LSI mounted on a second substrate. As a result, optimal amplitude, optimal emphasis characteristic, and optimal equalization characteristic can be set for the transmission of a signal between different LSIs mounted on different substrates, and optimal transmission waveform and optimal transmission quality can be obtained.

According to the present embodiment, a signal transmission apparatus includes a bus provided between the transmission unit and the reception unit, and includes a controller including a frequency characteristic measurement unit, a selection unit, and a setting unit. As a result, the transmission unit and the reception unit can be control through the bus, so that the frequency characteristics can be measured, and the BER and the eye opening can be measured, and so that the frequency characteristics, the BER, and the eye opening can be measured without preparing means for measuring the frequency characteristics, the BER, and the eye opening outside the signal transmission apparatus (LSI).

Preferred embodiments of the present invention will be explained with reference to accompanying drawings.

FIG. 1 is a block diagram illustrating an example of a signal transmission apparatus of the present embodiment, and illustrates a structure of an electronic device, such as a personal computer and a server, applied with the present embodiment.

For example, a personal computer (in other words, signal transmission apparatus) includes one or a plurality of printed circuit boards 1 and a connector 6, which connects the printed circuit boards 1. One or a plurality of LSIs 2 (in other words, one or a plurality of semiconductor devices, semiconductor chips, or integrated circuits) is mounted on each printed circuit board 1. Each LSI 2 includes a transmission unit 3, a reception unit 4, and a signal processing unit 5.

To distinguish the LSIs 2, one LSI 2 is referred to as "2A", and another LSI 2 is referred to as "2B". The same applies to the transmission units 3, etc.

The signal processing unit 5 executes a determined processing to generate a determined signal, and transmits the signal to the transmission unit 3. The processing is set in advance for each LSI 2, and is different in each LSI 2 (may be the same). Based on a parallel signal received from the signal processing unit 5, the transmission unit 3 generates a serial signal, which complies with a determined serial transmission protocol, and transmits the serial signal to the reception unit 4 of another LSI 2 through a transmission path 8. Based on the received serial signal, the reception unit 4 generates a determined parallel signal, and transmits the parallel signal to the signal processing unit 5. The signal processing unit 5 executes a determined processing.

Each transmission path 8 includes wires on the printed circuit board 1 and the connector 6 (in other words, internal wires thereof). A capacitor 7 is inserted into the transmission path 8 in series. The capacitor 7 electrically isolates the transmission unit 3 (in other words, LSI 2 thereof) and the reception unit 4 (in other words, LSI 2 thereof). The (decoupling) capacitor 7 is provided in a printed circuit board 1B, but may be provided in a printed circuit board 1A, or on both the printed circuit boards 1A and 1B. Direction of transmission in the transmission path 8 is not bidirectional, but is unidirectional from the transmission unit 3 to the reception unit 4. The present embodiment sets optimal values for the amplitude, the emphasis characteristic, and the equalization characteristic for a signal transmitted through the transmission path 8.

The LSI 2A is on the side of transmitting a signal in a certain transmission path 8, and is on the side of receiving a signal in another transmission path 8. In each LSI 2, transmission units 3A and 3B are configured in the same way, and reception units 4A and 4B are configured in the same way.

In the example, the transmission unit 3A is provided in the first LSI 2A, and the reception unit 4B is provided in the second LSI 2B different from the first LSI 2A. The transmission path 8 includes wires on the printed circuit boards 1A and 1B, which are mounted with the first LSI and second LSI 2A and 2B. In the example, the first LSI 2A is mounted on the first printed circuit board 1A, and the second LSI 2B is mounted on the second printed circuit board 1B, which is different from the first printed circuit board 1A. The first printed circuit board 1A and second printed circuit board 1B are connected by the connector 6.

Each LSI 2 may include only the transmission unit 3 or the reception unit 4. The transmission unit 3 and the reception unit 4 may also be provided in the same LSI 2. The first LSI and second LSI 2 may also be mounted on the same printed circuit board 1.

Figure 2:
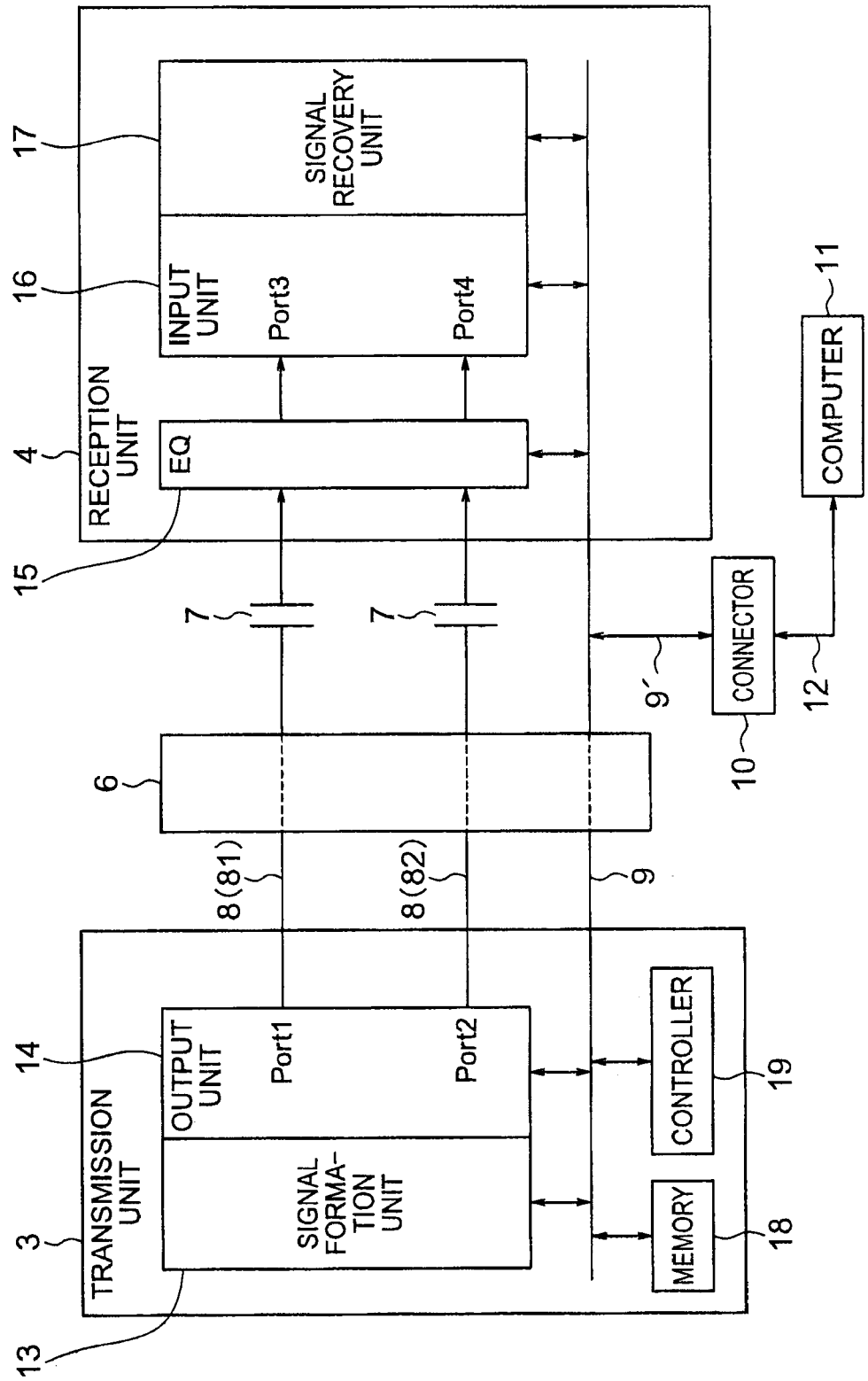
FIG. 2 is a block diagram illustrating a structure of the signal transmission apparatus of the present embodiment.

FIG. 2 is a block diagram illustrating a structure of the signal transmission apparatus of the present embodiment, and illustrates a structure of a pair of the transmission unit 3 (3A) and the reception unit 4 (4B), which are connected by the transmission path 8. In FIG. 2, the illustration of the printed circuit board 1 and the LSI 2 is omitted.

The transmission unit 3 transmits a signal, and includes a signal formation unit 13 which is transmission signal control means for controlling the amplitude and the emphasis characteristic of the signal. The reception unit 4 receives a signal, and includes an equalizer (EQ) 15 which is reception signal equalizing means for controlling the equalization characteristic of the signal. The transmission unit 3A of a certain LSI 2A is connected to the transmission unit 3B of another LSI 2B through the transmission path 8, and transmits a signal to the transmission unit 3B. Therefore, the transmission unit 3A and the reception unit 4B are paired (correspond) for the transmission of a serial signal through the transmission path 8.

The transmission unit 3 includes the signal formation unit 13 and an output unit (output circuit) 14 which includes a plurality of (differential) output ports. Based on a signal from the signal processing unit 5, the signal formation unit 13 forms a determined signal (serial signal) to be transmitted to the reception unit 4 of another LSI 2, and transmits the signal to the output unit 14. The output unit 14 outputs the determined serial signal to the transmission path 8. The signal outputted from the output unit 14 is transmitted through the transmission path 8, and reaches the equalizer 15 of the reception unit 4 of another LSI 2.

The reception unit 4 includes the equalizer (EQ) 15, an input unit (input circuit) 16 which includes a plurality of input ports, and a signal recovery unit 17. The equalizer 15 is provided at the front stage of the input unit 16, and equalizes an output impedance of the transmission path 8 and an input impedance of the input unit 16. The input unit 16 receives the determined serial signal from the transmission path 8, and transmits the received signal to the signal recovery unit 17. Based on the signal from the input unit 16, the signal recovery unit 17 restores a determined signal (parallel signal), and transmits the restored signal to the signal processing unit 5.

The plurality of LSIs 2 are connected by the transmission paths 8. The signal transmitted through the transmission paths 8 is, for example, a high-speed serial signal. Each transmission path 8 actually includes a pair of differential transmission paths. More specifically, a port 1 and a port 2 as well as a port 3 and a port 4 form differential ports. A transmission path 81 between the port 1 and the port 3 and a transmission path 82 between the port 2 and the port 4 form a pair of differential transmission paths. Serial signals transmitted through the transmission paths 81 and 82 are differential signals. The pair of differential transmission paths 81 and 82 forms a two-port circuit (network), which includes the (single-end) ports 1 to 4 as terminals.

The transmission path 8 is, for example, a PCI Express used in a personal computer or a server. The PCI Express is shifted from a PCI or a PCI-X. The transmission path 8 may be a Serial ATA used for connection with a storage device, such as an HDD and a CD-ROM. The Serial ATA is shifted from an ATA. The transmission path 8 may be a Serial Attached SCSI. The Serial Attached SCSI is shifted from a SCSI.

Between the transmission unit 3 and the reception unit 4, a bus 9 is provided that bidirectionaly communicates for transmission and reception of control signals, in addition to the transmission path 8. The bus 9 is, for example, a 32-bit parallel bus or 64-bit parallel bus, and a signal transmitted and received through the bus 9 is a parallel signal. Therefore, the computer includes a plurality of LSIs 2 which are connected by the serial buses 8 and the parallel buses 9.

The bus 9 allows bidirectional communications between the transmission unit 3 and the reception unit 4 that form a pair through the transmission path 8. More specifically, one bus 9 is provided for a set of the transmission unit 3, the transmission path 8, and the reception unit 4. The bus 9 includes a connector 10 (and a cable 12), and through this, a control computer 11 is connected. A bus 9' connects the bus 9 and the connector 10. The connector 10 may be provided in any printed circuit board 1.

A controller 19 including a CPU and a memory 18 used by the controller 19 are provided in the transmission unit 3. The controller 19 and the memory 18 are connected to the bus 9. The signal formation unit 13, the output unit 14, the equalizer 15, the input unit 16, and the signal recovery unit 17 are connected to the bus 9. In this way, the controller 19 controls the circuits 13 to 17 through the bus 9. A control signal transmitted and received through the bus 9 is a parallel signal. The computer 11 is connected to the controller 19 through the bus 9, etc., and controls the circuits 13 to 17 as a result of controlling the controller 19.

The transmission unit 3 and the reception unit 4 (and the signal processing unit 5) are circuits for realizing the original functions of the LSI 2. Meanwhile, the controller 19 and the memory 18 are circuits for executing a processing of setting the amplitude, the emphasis characteristic, and the equalization characteristic, according to the present embodiment.

The controller 19 and the memory 18 may be provided in the reception unit 4. Therefore, the controller 19 and the memory 18 are provided in one of the pair of the transmission unit 3 and the reception unit 4. Alternatively, the controller 19 and the memory 18 may be appropriately divided and provided in both the transmission unit 3 and the reception unit 4.

Figure 3:
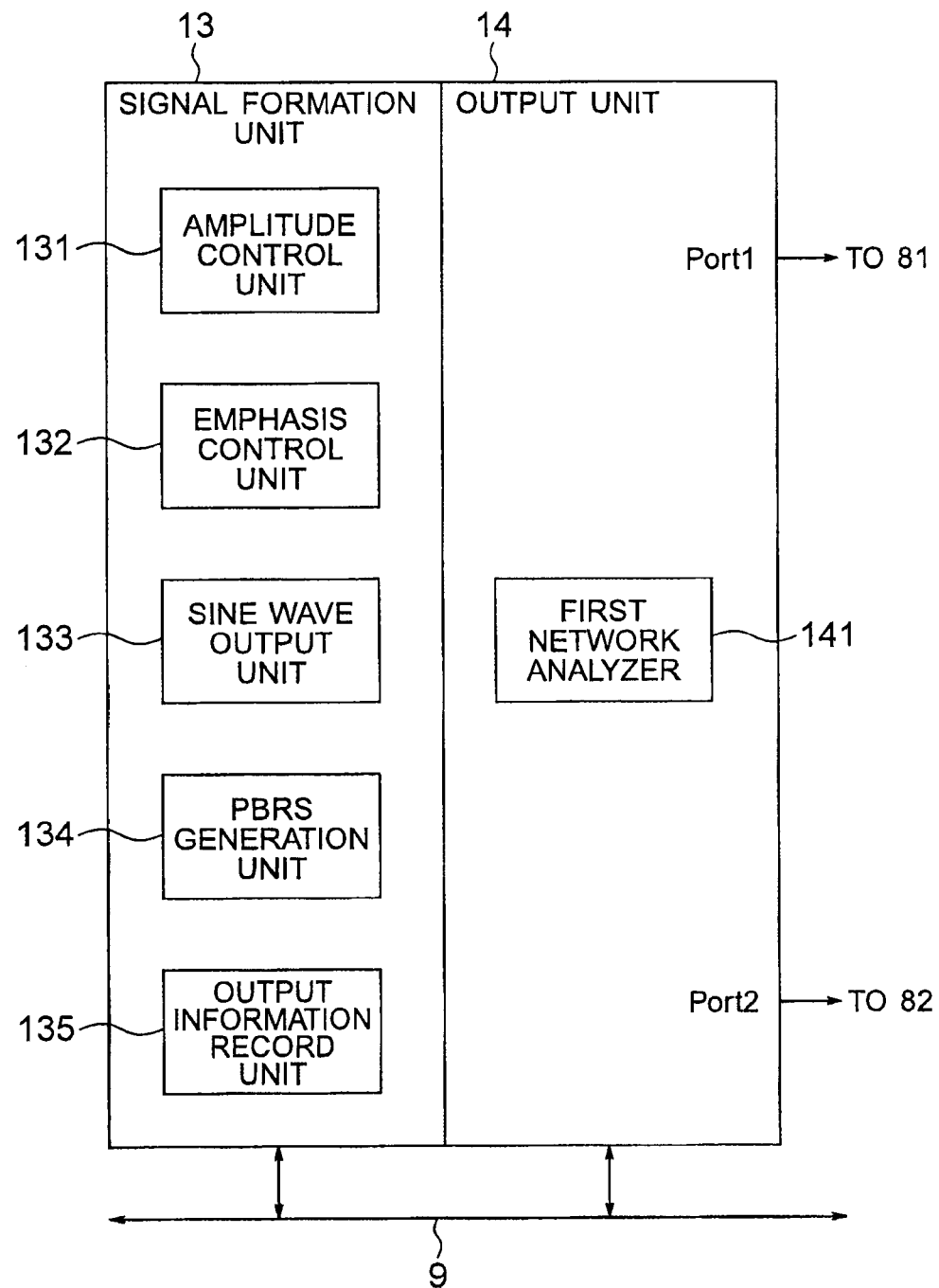
FIG. 3 is a block diagram illustrating a structure of the signal transmission apparatus of the present embodiment.

FIG. 3 is a block diagram illustrating a structure of the signal transmission apparatus of the present embodiment, and illustrates a structure of the transmission unit 3 of the LSI 2.

As described above, the transmission unit 3 includes the signal formation unit 13 and the output unit 14. The signal formation unit 13 includes an amplitude control unit 131, an emphasis control unit 132, a sine wave output unit 133, a PBRS generation unit 134, and an output information record unit 135. The output unit 14 includes a first network analyzer 141 other than a plurality of (differential) output ports.

The amplitude control unit 131 determines the amplitude (amplitude value) of a signal outputted from the output unit 14. More specifically, the amplitude control unit 131 determines the amplitude of a bit clock from the PBRS generation unit 134 or the amplitude of a clock during normal transmission. As described below, a setting unit 193 of the controller 19 sets the amplitude (amplitude value), which is set to the amplitude control unit 131.

The emphasis control unit 132 determines the emphasis characteristic of the signal outputted from the output unit 14. More specifically, the emphasis control unit 132 determines the emphasis characteristic of a bit clock from the PBRS generation unit 134 or the emphasis characteristic of a clock during normal transmission is determined. The setting unit 193 sets the emphasis characteristic, which is set to the emphasis control unit 132.

The sine wave output unit 133 is a signal output unit, forms a sine wave as an output signal in an optimization processing according to the control by the controller 19, and outputs the sine wave to the output unit 14. Accordingly, the output unit 14 forms a differential signal of the sine wave, and outputs the differential signal from the ports 1 and 2. In this way, the sine wave output unit 133 outputs the sine wave (differential signal) to the transmission path 8. In place of the sine wave output unit 133, a signal output unit may be provided that forms a signal having another waveform and outputs the signal to the transmission path 8.

Figure 6:
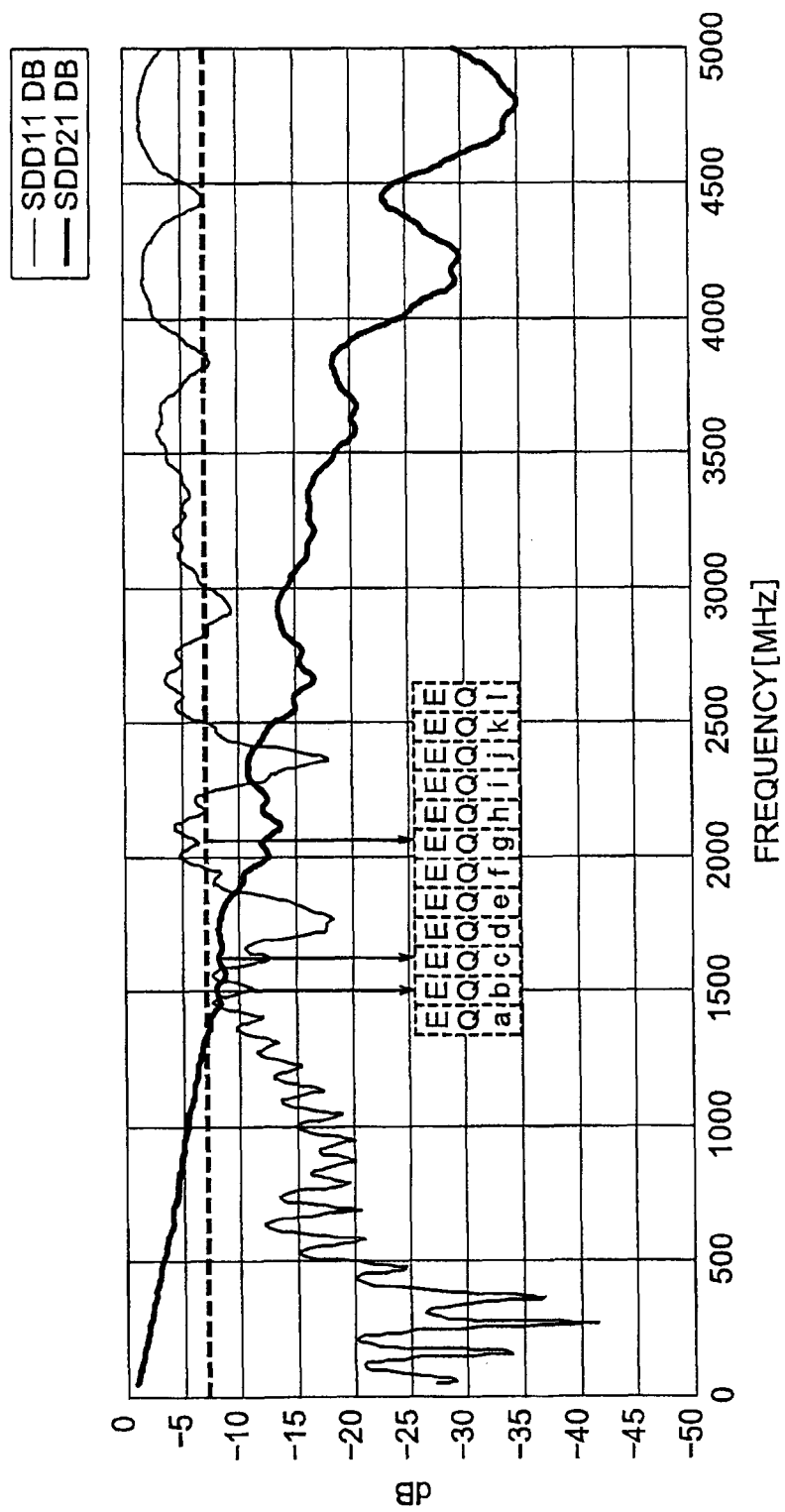
FIG. 6 is an explanatory diagram of a signal transmission optimization processing of the present embodiment.
Figure 8:
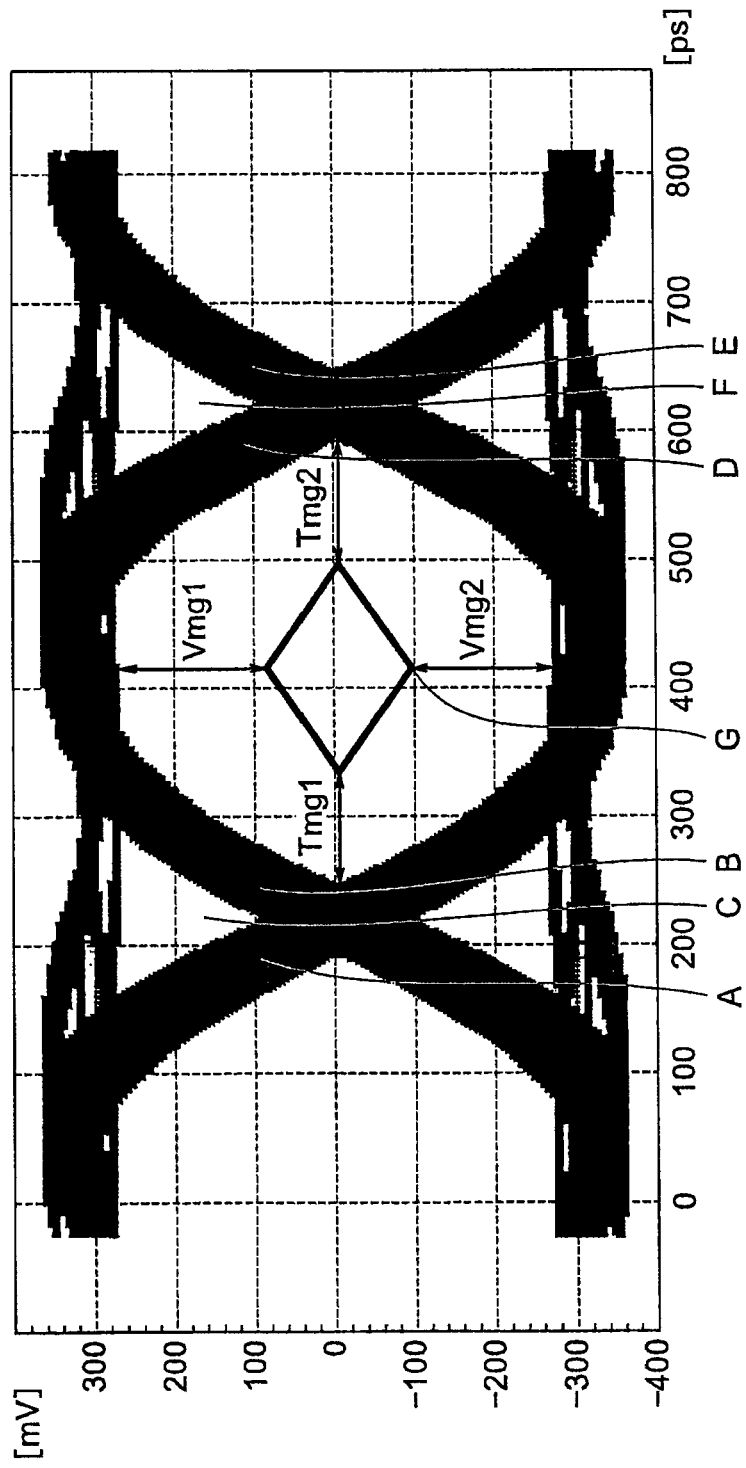
FIG. 8 is an explanatory diagram of the signal transmission optimization processing of the present embodiment.

To measure the S parameters illustrated in FIG. 6, the sine wave to be outputted has a determined amplitude (without emphasis processing), for example. The determined amplitude value is transmitted to an S parameter measurement unit 191 as necessary. In this case, it is needed to change frequency of the sine wave, as illustrated in FIG. 8. However, the frequency is actually in a range of practical frequency, which is empirically determined. For example, the frequency is in a range that the SDD11 and the Differential Insertion Loss Scattering parameters (SDD21 parameters) have close values, such as 1000 to 3000 MHz. The upper limit value at this point may be SDD11-lmt, for example, described below. During normal signal transmission, the signal formation unit 13 forms an output signal based on the signal from the signal processing unit 5, and outputs the signal to the output unit 14.

According to the control by the controller 19, the PBRS generation unit 134 generates bit clocks in various bit patterns for the measurement of the BER by a BER measurement unit 163 described below during BER measurement, and outputs the bit clocks to the output unit 14. As a result, during BER measurement, the output unit 14 outputs the bit clock (differential signal) for measuring the BER. During normal transmission, the output unit 14 outputs a pulse wave formed by the signal formation unit.

The output information record unit 135 records, in advance, information (output information) related to signals that the output unit 14 can output from the output port to the transmission path 8. More specifically, the output information record unit 135 stores characteristic information (in other words, specifications of the output unit 14) related to the output characteristics of the output unit 14 (transmission unit 3). The information includes, for example, a plurality of possible amplitudes, a plurality of possible emphasis characteristics, etc., of the output unit 14.

A network analyzer includes the first network analyzer 141 provided in the transmission unit 3, and a second network analyzer 161 (described below) provided in the reception unit 4. According to the control by the controller 19, the network analyzers 141 and 161 analyze signals on the transmission path 8 in a state that the equalizer 15 is cut off from the reception unit 4, during an optimization processing. More specifically, the transmission and reception of the sine waves in the transmission path 8 are analyzed. Particularly, the first network analyzer 141 analyzes (calculates) reflection and crosstalk (SDD11; input differential reflection loss) in the transmission path 8 in the state that the equalizer 15 is cut off from the reception unit 4. As described below, the equalizer 15 is cut off from the reception unit 4 before the analysis by the network analyzers 141 and 161. Due to the cutting off the equalizer 15 from the reception unit 4, it is possible to analyze the reflection characteristics in the transmission path 8.

Figure 4:
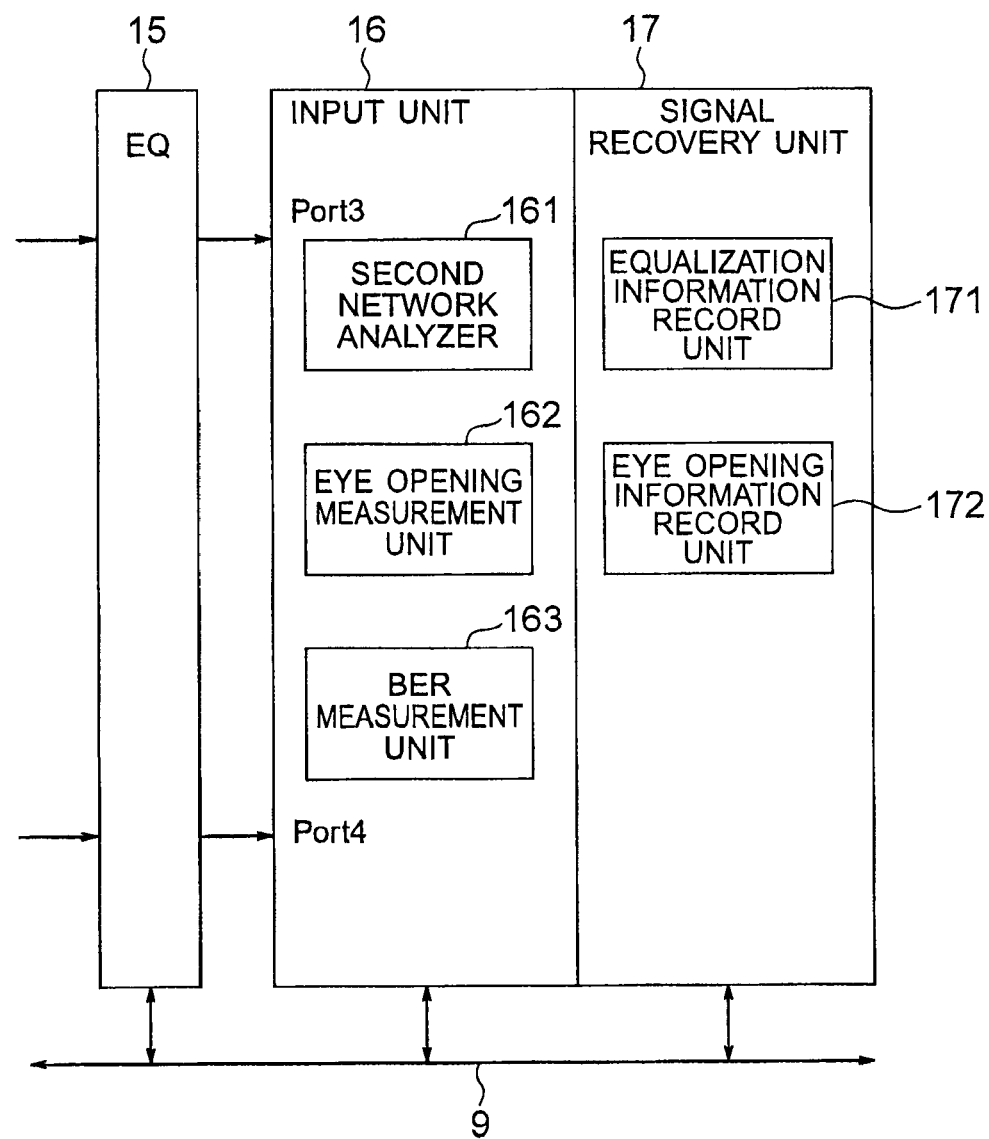
FIG. 4 is a block diagram illustrating a structure of the signal transmission apparatus of the present embodiment.

FIG. 4 is a block diagram illustrating a structure of the signal transmission apparatus of the present embodiment, and illustrates a structure of the reception unit 4 of the LSI 2.

As described above, the reception unit 4 includes the equalizer 15, the input unit 16, and the signal recovery unit 17. The input unit 16 includes the second network analyzer 161, an eye opening measurement unit 162, and the BER (bit error rate) measurement unit 163, in addition to a plurality of (differential) input ports. The eye opening measurement unit 162 and the BER measurement unit 163 form a measurement unit. The signal recovery unit 17 includes an equalization information record unit 171 and an eye opening information record unit 172.

The second network analyzer 161 is provided in the reception unit 4, and analyzes (calculates) transmission and crosstalk (SDD21; input differential insertion loss) in the transmission path 8, in the state that the equalizer 15 is cut off from the reception unit 4. Due to cutting off the equalizer 15 from the reception unit 4 it is possible to analyze the transmission characteristics in the transmission path 8.

According to the control by the controller 19, during the optimization processing, the measurement units 162 and 163 measure at least one of the BER (bit error rate) and the eye opening of the transmission path 8 for the combination of the amplitude, the emphasis characteristic, and the equalization characteristic, which are selected by the selection unit 192. The combination will be described below.

In the example, the measurement units 162 and 163 measure both the BER and the eye opening for the combinations of one or more amplitudes and one or more equalization characteristics, which are selected by the selection unit 192. More specifically, according to the control by the controller 19, during the optimization processing, the BER measurement unit 163 measures the BER of the transmission path 8, and, based on the measurement of the BER, the eye opening measurement unit 162 measures the eye opening of the transmission path 8 for one or more combinations having the BER lower than a determined value among the combinations.

The equalization information record unit 171 records, in advance, information (equalization information) related to the equalization characteristic of the corresponding equalizer 15. More specifically, the equalization information record unit 171 stores a plurality of possible equalization characteristics (in other words, specifications of the equalizer 15) of the equalizer 15.

The eye opening information record unit 172 records, in advance, information (eye opening information) related to the eye opening in the input unit 16. More specifically, the eye opening information record unit 172 stores a plurality of possible eye openings (in other words, specifications of the input unit 16) of the input unit 16.

Figure 5:
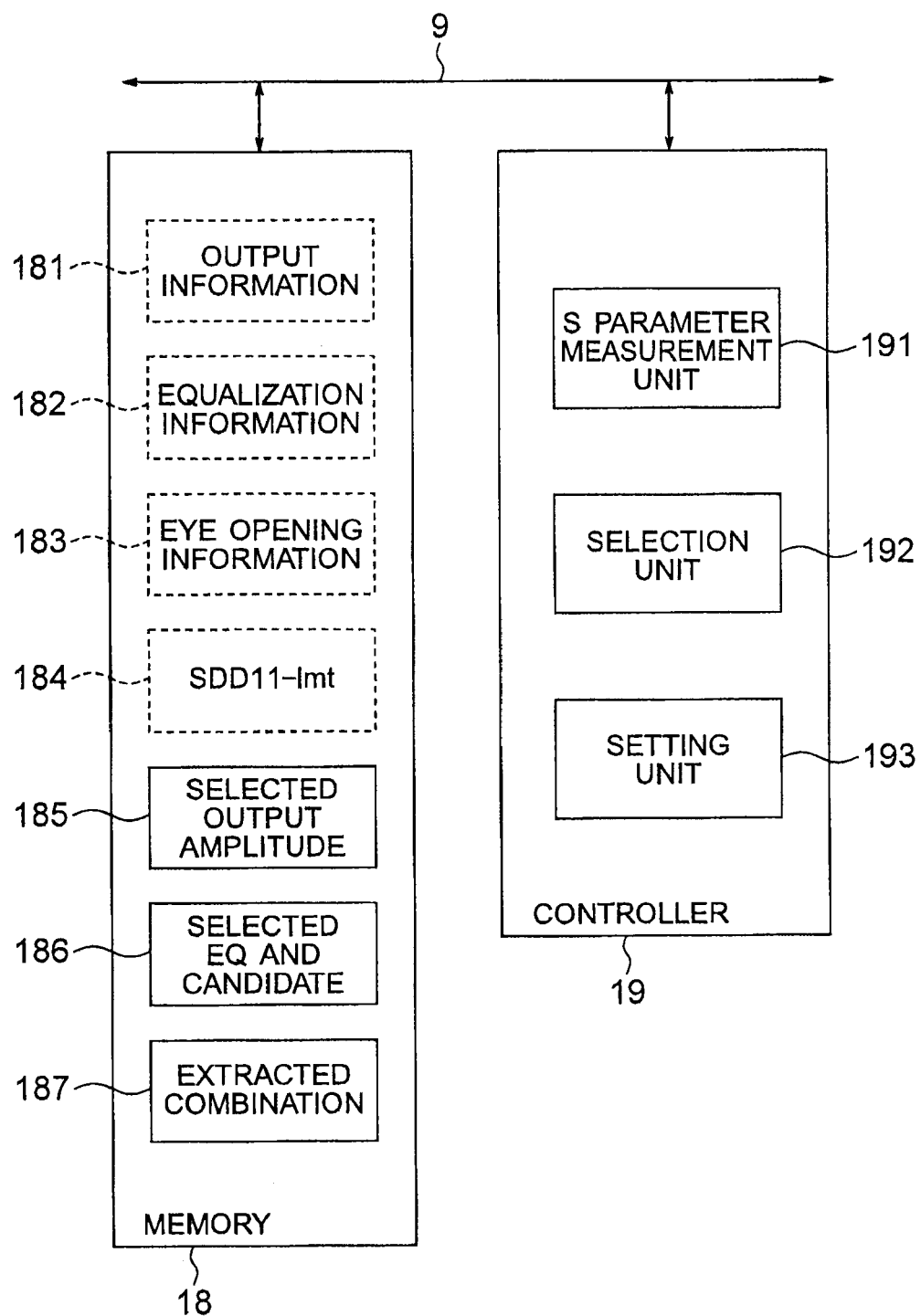
FIG. 5 is a block diagram illustrating a structure of the signal transmission apparatus of the present embodiment.

FIG. 5 is a block diagram illustrating a structure of the signal transmission apparatus of the present embodiment, and illustrates a structure of the controller 19 and the memory 18, which are provided in the transmission unit 3.

The memory 18 stores output information 181, equalization information 182, eye opening information 183, SDD-lmt (SDD-lmt value) 184, selected output amplitude 185, selected equalizer (EQ) and candidate 186, and extracted combinations 187. The controller 19 includes an S parameter measurement unit 191, a selection unit 192, and a setting unit 193.

Before the start of a processing, the output information 181 is read out from the output information record unit 135 by the controller 19 and stored. Before the start of a processing, the equalization information 182 is read out from the equalization information record unit 171 by the controller 19 and stored. Before the start of a processing, the eye opening information 183 is read out from the eye opening information record unit 172 by the controller 19 and stored.

The SDD-lmt (SDD-lmt value) 184 is stored by the controller 19 before the start of a processing. The computer 11 inputs the SDD-lmt 184 to the controller 19.

The selected output amplitude 185 is an output amplitude (output amplitude value), which is selected by the selection unit 192 of the controller 19, and is obtained by a processing of the present embodiment. The selected equalizer (EQ) and candidate 186 are an equalization characteristic (center frequency of the equalizer 15) and a candidate (frequency), which are selected by the selection unit 192, and is obtained by a processing of the present embodiment. The extracted combinations 187 denote combinations of the amplitude, the emphasis characteristic, and the equalization characteristic, which are extracted by the selection unit 192, and are obtained by a processing of the present embodiment.

The controller 19 is activated by a determined specific instruction inputted from the computer 11, which is connected to the bus 9 through the connector 10 and the wires 12, and starts an optimization processing. At this point, along with the specific instruction, the SDD-lmt 184 is provided as described above.

The S parameter measurement unit 191 measures (calculates) the S parameters of the transmission path 8 based on the analysis by the first network analyzer 141 and second network analyzer 161. Therefore, the first network analyzer 141 and second network analyzer 161 transmit the measured data to the S parameter measurement unit 191 of the controller 19 through the bus 9. The S parameters are parameters indicating the frequency characteristics (dB) of the transmission path 8. In place of the S parameter measurement unit 191, a frequency characteristic measurement unit may be provided that measures other parameters indicating the frequency characteristics of the transmission path 8.

The selection unit 192 executes a processing (optimization processing) of signal transmission based on various (a plurality of) measurement values to calculate optimized set values. More specifically, the selection unit 192 selects a plurality of combinations of amplitude, emphasis characteristic, and equalization characteristic based on the S parameters measured by the S parameter measurement unit 191, and stores the combinations as extracted combinations 187. The emphasis characteristics may be excluded from the combinations. In other words, a plurality of combinations of the amplitude and the equalization characteristic may be selected.

Specifically, the selection unit 192 selects one or more amplitudes satisfying a determined selection condition based on the S parameters, and stores the selected amplitudes in the selected output amplitude 185. The selection unit 192 selects one or more equalization characteristics having a determined frequency band based on the S parameters. The selection unit 192 further selects a center value of the equalization characteristic and a plurality of values above and below the center value, for the selected one or more equalization characteristics. And then, the election unit 192 stores the center value and the plurality of values above and below the center value in the selected EQ and candidate 186.

The determined selection condition is a condition defined using SDD11 parameters (parameters indicating the reflection characteristics), which is defined in the model of the S parameters. The determined frequency band is a frequency lower than the upper limit value (SDD11-lmt) of the SDD11 parameters in the model of the S parameters.

In the example, the selection unit 192 selects one or more amplitudes based on not only the S parameters but also the prepared plurality of possible amplitudes of signal and prepared possible eye openings (eye opening values) of signal.

The setting unit 193 cuts off the equalizer 15, which is as reception signal equalizing means, from the reception unit 4 (in other words, turns off the equalizer 15) before the analyzing of the signal by the network analyzers 141 and 161. The setting unit 193 also is a control unit of the equalizer 15. The selection unit 192 may control the equalizer 15.

The setting unit 193 also sets a set value calculated (optimized) by the selection unit 192. Therefore, the setting unit 193 controls the S parameter measurement unit 191 and the selection unit 192.

The setting unit 193 also extracts single combination from the plurality of combinations selected by the selection unit 192 based on the measurement of the BER or the eye opening by the measurement units 162 and 163. And, the setting unit 193 sets the extracted amplitude, the extracted emphasis characteristic, and the extracted equalization characteristic to the transmission unit 3 and the reception unit 4. More specifically, the extracted amplitude is set to the amplitude control unit 131, the extracted emphasis characteristic is set to the emphasis control unit 132, and the extracted equalization characteristic of the equalizer 15 is selected. In the example, the setting unit 193 extracts the single combination from the plurality of combinations based on the measurement of both the BER and the eye opening. At this point, based on the measurement of the eye opening, the single combination having the largest eye opening is extracted and set from the plurality of combinations.

As described above, in the present embodiment, the controller 19 extracts S parameters based on the measurement of the network analyzers 141 and 161 after turning off the equalizer 15. And, based on the S parameter characteristics, the controller 19 selects, for example, three types of setting candidates of the amplitudes, the emphasis characteristics, and the equalization characteristics, each that are expected to be optimal. A plurality of setting candidates, for example, five types of setting candidates may be selected. As described above, the possible values of the amplitudes, the emphasis characteristics, and the equalization characteristics are stored in advance. The amplitudes and the emphasis characteristics are selected based on attenuation characteristics. The values of the S parameter characteristics SDD21 and SDD11 in the center frequency of all equalizers are read out, and an equalizer having SDD11≦N [dB] and having a center frequency with small reflection is selected as the equalizer 15. N is an empirically determined value, and is 12 to 15 [dB], for example. By amplifying M=−[SDD11 (read value)+N] [dB], the equalizer 15 can improve the attenuation characteristics SDD21 while controlling the reflection components below a certain value.

FIG. 6 is an explanatory diagram of a signal transmission optimization processing of the present embodiment, and illustrates the SDD21 (parameters indicating the transmission characteristics) and the SDD11. In FIG. 6, the vertical axis illustrates attenuation (dB), and the horizontal axis illustrates frequency (MHz). As can be seen from FIG. 6, the value of the SDD21 is greater than the SDD11 when the frequency is low, and the value of the SDD21 is smaller than the SDD11 when the frequency is high.

The S parameters are also different device by device. The equalizer 15, etc., are selected to make the values of the SDD21 and the SDD11 relatively large. Therefore, an equalizer 15 which is expected to be optimal can be selected.

Figure 7:
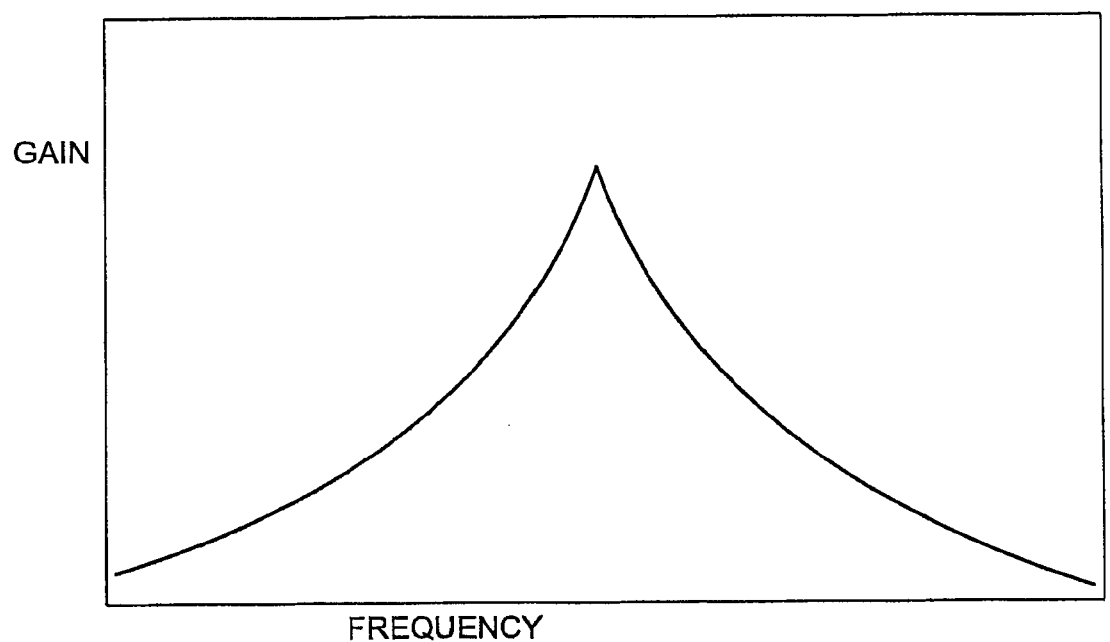
FIG. 7 is an explanatory diagram of the signal transmission optimization processing of the present embodiment.

FIG. 7 is an explanatory diagram of the signal transmission optimization processing of the present embodiment, and illustrates frequency characteristics of the equalizer 15. In FIG. 7, the vertical axis illustrates gain, and the horizontal axis illustrates frequency. As can be seen from FIG. 7, the frequency characteristics of the equalizer 15 indicate the largest gain at a certain frequency (in other words, center frequency).

The equalization characteristic (in other words, center frequency) of the equalizer 15 is also different device by device. The center frequency may not be optimal for the transmission path 8. Therefore, the equalization characteristic (in other words, center frequency) of the equalizer 15 and one or a plurality of values above and below (left and right in the graph) of the equalization characteristic are selected. As a result, it is possible to select the equalization characteristic (in other words, frequency) that is a value close to the center frequency of the equalizer 15 and that are suitable for the transmission path 8.

Subsequently, the controller 19 measures the eye opening and the BER based on the combination of the set candidates, and extracts an optimal setting condition, in which the BER is error-free and the eye opening is the largest. Error-free means a range that an occurrence rate of error is lower than an expected value (in other words, range that errors can be ignored), and means that the BER is smaller than $10^{-15}$, for example. The measurement of the eye opening is equivalent to the measurement of the jitter of the transmission path 8 and the amplitude.

FIG. 8 is an explanatory diagram (eye diagram) of the signal transmission optimization processing of the present embodiment, and illustrates the definition of the eye opening. The eye opening is a part surrounded by transmitted waveforms of "0" and "1". The larger the eye opening is, the easier is the distinction between "0" and "1".

In FIG. 8, C denotes the center point between A and B, F denotes the center point between D and E, G denotes the center point between C and F, Vmg denotes an eye margin voltage value, and Tmg denotes an eye margin time value. When (smaller one of Vmg1 and Vmg2)>0 and (smaller one of Tmg1 and Tmg2)>0 is satisfied for an eye opening, the eye opening is an opening greater than the specifications, and it can be stated that the eye opening is in excellent condition.

In the present embodiment, an eye opening having the largest Vmg and the largest Tmg is selected. When a plurality of combinations has openings greater than the specifications, the one having a larger Vmg is selected regardless of the value of Tmg.

The controller 19 executes the optimization processing as described above, and then normal transmission is started. As a result, it is possible to transmit stably with a state in which the characteristics of the transmission path 8 are optimally set in all mass production devices without being influenced by various factors, and thus to easily realize high reliability. Furthermore, a stable transmission system can be always established during load change by performing the optimization in response to the load change.

Figure 9:
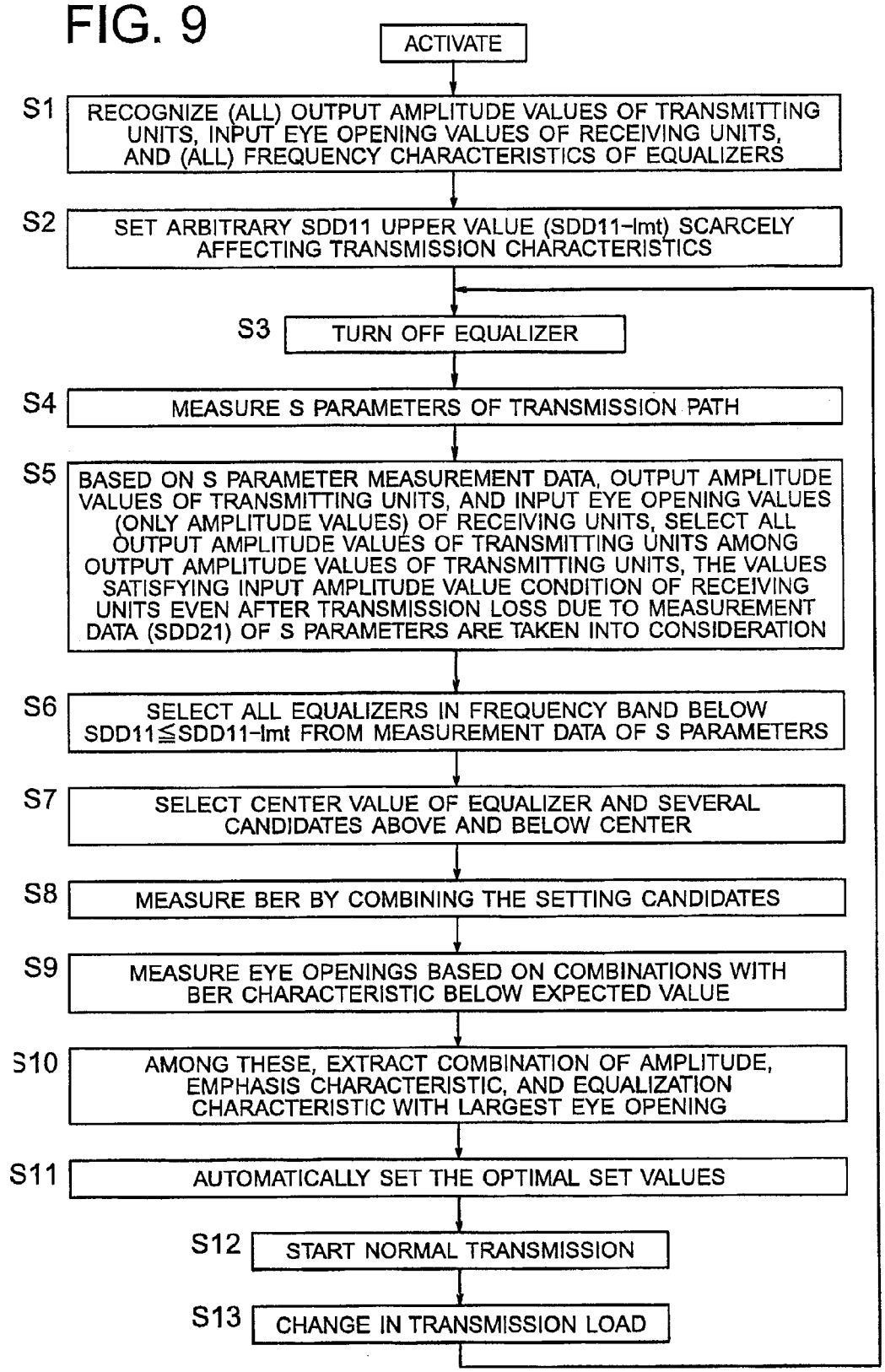
FIG. 9 is a flow chart of the signal transmission optimization processing of the present embodiment.
Figure 10:
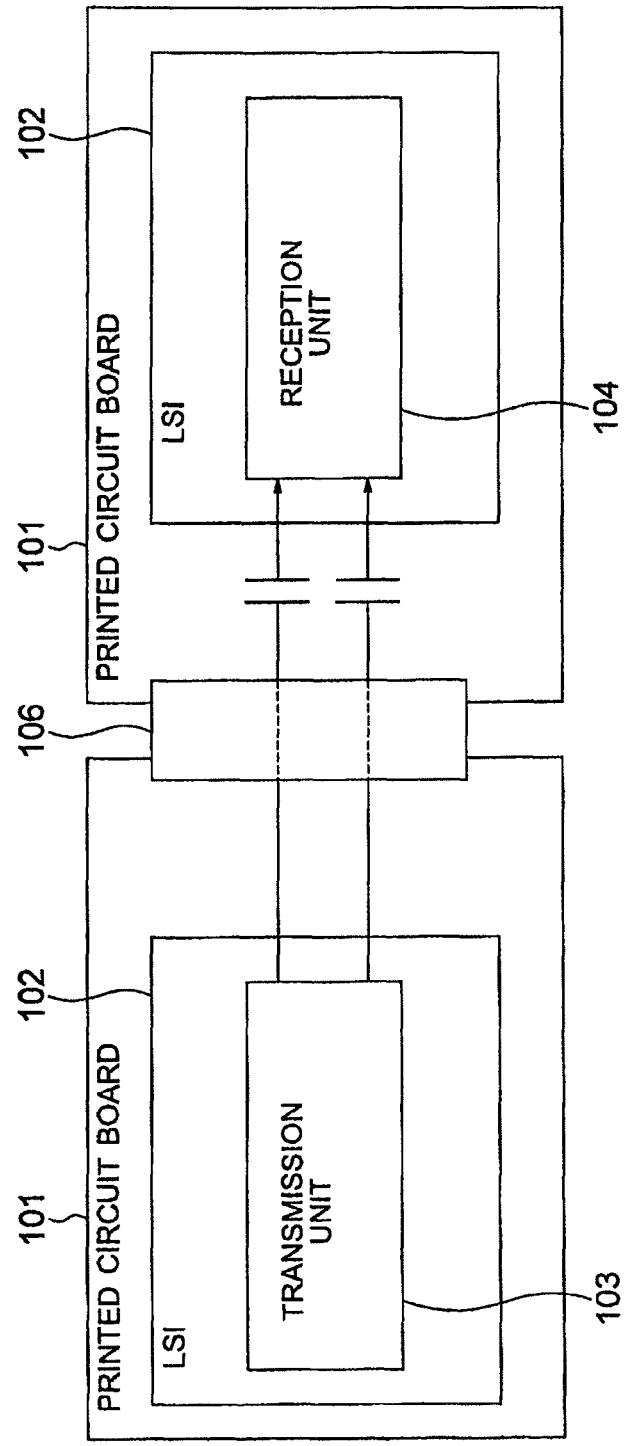
FIG. 10 is a block diagram illustrating a conventional signal transmission apparatus.

FIG. 9 is a flow chart of the signal transmission optimization processing of the present embodiment, and mainly illustrates an optimization processing of signal transmission executed by the controller 19.

During shipping inspection at a factory, the computer 11 is connected to the connector 10 of an electronic device, which is a production (inspection target). The computer 11 inputs a specific instruction to the controller 19 through the bus 9, and activates the controller 19. The activated controller 19 executes the following optimization processing.

First, the selection unit 192 of the controller 19 performs preprocessing of the optimization processing. More specifically, the selection unit 192 recognizes all output amplitude values of transmission units 3, all input eye opening values of the reception units 4, and all frequency characteristics of equalization characteristics (step S1). Therefore, as described above, the output information 181, the equalization information 182, and the eye opening information 183 are stored in the memory 18. Subsequently, according to input from the computer 11, the selection unit 192 sets an upper limit value of the SDD11 (SDD11-lmt 184), that scarcely affects the transmission characteristics, to the memory 18 (step S2). The upper limit value can be empirically calculated.

Subsequently, the setting unit 193 turns off the equalizer (EQ) 15 in relation to a certain transmission path 8 (step S3).

Subsequently, according to an instruction of the setting unit 193, the S parameter measurement unit 191 measures S parameters of the transmission path 8 (step S4). Prior to this processing, according to an instruction of the controller 19, the output unit 14 outputs a sine wave based on a sine wave from the sine wave output unit 133. After the measurement of the S parameters, the selection unit 192 selects all output amplitude values of transmission units 3 that satisfy a determined selection condition among the all output amplitude values of transmission units 3, based on the measurement values of the S parameters, the output amplitude values of the transmission units 3, and the input eye opening values (only the amplitude values) of the reception units 4, and stores the selected values in the output amplitude 185 (step S5). In the determined selection condition, an output amplitude value of the transmission unit 3 satisfies an input amplitude value condition of the reception unit 4 even after the measurement values of the S parameters and the transmission loss due to the SDD21 are taken into consideration. The input amplitude value condition of the reception unit 4 is determined according to the output amplitude value of the transmission unit 3.

Subsequently, the selection unit 192 selects all equalizers 15 having frequency bands in which SDD11≦SDD11-lmt is satisfied based on the measurement values of the S parameters (step S6). Then, the selection unit 192 selects a center value and a plurality of candidates of the equalizers 15 above and below the centers, and stores the values in the selected EQ and candidate 186 (step S7). The number of candidates above and below the center values is empirically determined in advance.

Subsequently, the selection unit 192 measures the BER by the BER measurement unit 163 for above and below the selected center values by combining the plurality of candidates based on the selected output amplitude 185 and the selected EQ and candidate 186 (step S8). After the measurement in step S8, the selection unit 192 measures the eye openings by the eye opening measurement unit 162 based on (a plurality of) combinations having BER characteristics lower than the expected value (step S9). The selection unit 192 extracts the single combination of the amplitude, the emphasis characteristic, and the equalization characteristic for the largest eye opening among the measured eye openings (step S10). And, the setting unit 193 sets the extracted values (step S11). In the example, the emphasis characteristic is empirically determined in step S10.

Subsequently, the computer 11 is removed from the connector 10, and normal signal transmission is started (step S12). In the normal transmission, when there is a change in the transmission load (step S13), the processing after step S3 is repeated.

Actually, the processing up to step S11 is executed in a factory of a maker before shipment, and the user after shipment executes the processing after step S12. Step S13 is a processing that is executed by connecting the computer 11 to the computer, and is formed by steps S1 to S11. Therefore, step S13 can be skipped, and is skipped in many cases.

Next, optimization of the signal transmission according to the present embodiment is described with a specific example. In advance, information of the amplitude and the emphasis characteristic of the transmission LSI 2A and information of the frequency response characteristic and the eye opening of the equalizer 15 of the reception LSI 2B are read out to the memory 18. The candidates of the settings are three types each. Therefore, 27 combinations are possible.

For example, it is assumed that the transmission rate is 3.125 Gbps, possible amplitude is 400 to 800 m Vpp-diff (variable in 100 m Vpp-diff/step), possible (in other words, empirically determined) emphasis characteristic is −3.5±0.5 dB, and the voltage of the eye opening is 200 m Vpp-diff. In this case, there are the following five ways of transmittable transmission loss:

(1) When the amplitude is 400 m Vpp-diff, the transmission loss is below −20 log(200/400)=−6.02 dB;
(2) When the amplitude is 500 m Vpp-diff, the transmission loss is below −20 log(200/500)=−7.96 dB;
(3) When the amplitude is 600 m Vpp-diff, the transmission loss is below −20 log(200/600)=−9.54 dB;
(4) When the amplitude is 700 m Vpp-diff, the transmission loss is below −20 log(200/700)=−10.88 dB; and
(5) When the amplitude is 800 m Vpp-diff, the transmission loss is below −20 log(200/800)=−12.04 dB.

In a state that the equalizer 15 turned off, the S parameters are extracted based on the measurement of the network analyzers 141 and 161. The S parameters are illustrated in FIG. 6. Since the SDD21 characteristic is −8.77 dB when the frequency is 1.5625 GHz (half the value of the transmission rate), it can be understood that the amplitude needs to be more than 600 m Vpp-diff. Therefore, the above (3), (4), and (5) are selected as candidates of the amplitude setting. Meanwhile, the candidates of the emphasis characteristic are, empirically, −3.0 dB, −3.5 dB, and −4.0 dB. When SDD11≦−12 [dB] is set for the selection candidate, the selection candidates of the frequency characteristics of the equalizers 15 are EQb, EQc, and EQg. An amplification value M at the center frequency of each equalizer 15 is M=−[SDD11 measurement value +12] [dB].

The BER is actually measured for all combinations of the amplitudes (the above (3), (4), and (5)), the emphasis characteristics (−3.0 dB, −3.5 dB, and −4.0 dB), and the frequency characteristics (EQb, EQc, and EQg), which are calculated as described above. The reception waveform is measured for error-free combinations in the measurement of the BER, and then the single combination is extracted which has the largest eye opening (in other words, the excellent eye opening characteristic). The single combination is the optimal combination of the amplitude, the emphasis characteristic, and the frequency characteristic. The optimal combination is set to perform normal transmission of signal (pulse wave).

Although the present embodiment has been described, various modifications can be made within the scope of the present invention.

For example, the transmission unit 3, the reception unit 4, the transmission path 8, the sine wave output unit 133, the network analyzers 141 and 161, the S parameter measurement unit 191, the selection unit 192, the measurement units 162 and 163, and the setting unit 193 may be provided as one circuit group, and a plurality of circuit groups may be provided.

In this case, the plurality of circuit groups may be provided in the same LSI 2 or on the same printed circuit board 1. In relation to the transmission directions of all circuit groups, the numbers of transmissions and numbers of receptions may not be the same, and the transmission directions may be the same direction.

A transmission unit of at least one circuit group of the plurality of circuit groups may be provided in the first LSI 2, a reception unit of at least one other circuit group of the plurality of circuit groups may be provided in the second LSI 2B, which is different from the first LSI 2A, and the transmission path 8 may be wires on the printed circuit board 1 mounted with the first LSI 2A and second LSI 2B.

Furthermore, as illustrated in FIG. 1, transmission and reception may be performed between the first LSI 2A and second LSI 2B.

Furthermore, in the plurality of circuit groups, a circuit (particularly, measurement unit) other than the transmission unit 3 and the reception unit 4 may be commonly provided for the plurality of circuit groups.

As described above, according to the present embodiment, in the signal transmission apparatus and the signal transmission method, S parameters can be measured by outputting, for example, a sine wave to a transmission path. And, based on the actually measured S parameters, it is possible to efficiently measure a plurality of combinations of the amplitude, the emphasis characteristic, and the equalization characteristic, which are considered to include an optimal solution. Furthermore, the single combination having the best actual transmission quality can be extracted from the plurality of combinations based on actually measured BER or eye opening As a result, optimal values can be set for the amplitude, the emphasis characteristic, and the equalization characteristic of a signal transmitted in an electronic device based on the actual measurement without manual operation, and thus optimal transmission wave and transmission quality can be obtained.

Particularly, based on the actual measurement, the amplitude, the emphasis characteristic, and the equalization characteristic can also be optimally set for mass production devices, in which the influence of production variations tends to become apparent. A multiplicity of factors of the production variations can be comprehensively, not individually, taken into consideration to optimally set the amplitude, the emphasis characteristic, and the equalization characteristic. During the shipping inspection of the mass production devices, characteristics specific to the device can be taken into consideration for each mass production device to efficiently set the amplitude, the emphasis characteristic, and the equalization characteristic. As a result, enormous man-hours for setting the amplitude, the emphasis characteristic, and the equalization characteristic in the shipment of the mass production devices can be reduced.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the sprit and scope of the invention.

What is claimed is:

1. A signal transmission apparatus comprising:
    a transmission unit transmitting a signal, and comprising transmission signal control means for controlling an amplitude of the signal and an emphasis characteristic of the signal;
    a reception unit receiving the signal, and comprising reception signal equalizing means for controlling an equalization characteristic of the signal;
    a transmission path connecting the transmission unit and the reception unit, and transmitting the signal;
    a signal output unit outputting the signal to the transmission path;
    a network analyzer analyzing the signal on the transmission path in a state that the reception signal equalizing means is cut off from the reception unit;
    a frequency characteristic measurement unit measuring frequency characteristics of the transmission path based on the analysis by the network analyzer;
    a selection unit selecting a plurality of combinations of amplitude, emphasis characteristic, and equalization characteristic based on the frequency characteristics;
    a measurement unit measuring a BER (bit error rate) and an eye opening of the transmission path for the plurality of combinations of amplitude, emphasis characteristics, and equalization characteristics;
    a setting unit extracting single combination from the plurality of combinations of amplitude, emphasis characteristics, and equalization characteristics based on the measurement of the BER and the eye opening, and setting the extracted amplitude, the extracted emphasis characteristic, and the extracted equalization characteristic to the transmission unit and the reception unit;
    wherein the measurement unit comprises a BER measurement unit measuring the BER of the transmission path, and an eye opening measurement unit measuring the eye opening of the transmission path;
    wherein the selection unit selects one or more amplitudes satisfying a selection condition that is determined based on the frequency characteristics, selects one or more equalization characteristics having a frequency band that is determined based on the frequency characteristics, and selects a center value and a plurality of values above and below the center value of the selected equalization characteristic as the equalization characteristic;
    wherein the frequency characteristics comprise Scattering parameters (S parameters);
    wherein the determined selection condition is a condition that is defined using Differential Return Loss Scattering parameters (SDD11 parameters) defined in a model of the Scattering parameters (S parameters); and
    wherein the determined frequency band is a frequency below an upper limit value of the SDD11 parameters in the model of the Scattering parameters (S parameters).

2. The signal transmission apparatus according to claim 1, further comprising:
    a control unit cutting off the reception signal equalizing means from the reception unit before the analyzing of the signal by the network analyzer.

3. The signal transmission apparatus according to claim 1, wherein:
    the measurement unit measures the eye opening of one or more combinations having the BER lower than a determined value among the plurality of combinations of amplitude, emphasis characteristics, and equalization characteristics based on the measurement of the BER; and
    the setting unit extracts the single combination having the largest eye opening from the plurality of combinations based on the measurement of the eye opening.

4. The signal transmission apparatus according to claim 1, wherein:
    the selection unit selects the one or more amplitudes based on a plurality of prepared possible amplitudes of the signal and prepared possible eye openings of the signal in addition to the frequency characteristics.

5. The signal transmission apparatus according to claim 1, wherein:
    the determined selection condition is a condition that is defined using Differential Return Loss Scattering parameters (SDD11 parameters) defined in a model of the S parameters as the frequency characteristics;
    the determined frequency band is a frequency lower than upper limit value of the SDD11 parameters in the model of the S parameters;
    the selection unit selects the one or more amplitudes based on the plurality of prepared possible amplitudes of the signal and the prepared possible eye openings of the signal in addition to the S parameters;
    the measurement unit measures the BER for the combinations of the selected one or more amplitudes and the selected one or more equalization characteristics, and measures the eye opening for the one or more combinations having the BER lower than the determined value among the combinations based on the measurement of the BER; and
    the setting unit extracts the single combination having the largest eye opening from the plurality of combinations of amplitude, emphasis characteristics, and equalization characteristics based on the measurement of the eye opening.

6. The signal transmission apparatus according to claim 1, wherein:
    the signal output unit comprises a sine wave output unit that is provided in the transmission unit and outputs sine wave;
    the measurement unit is provided in the reception unit;
    the network analyzer comprises a first network analyzer provided in the transmission unit and a second network analyzer provided in the reception unit; and
    the frequency characteristic measurement unit measures the S parameters as the frequency characteristics based on the analysis by the first network analyzer and second network analyzer.

7. The signal transmission apparatus according to claim 6, wherein the transmission unit is provided in a first Large Scale Integration (LSI), the reception unit is provided in a second LSI that is different from the first LSI, and the transmission path comprises wires on a substrate mounted with the first LSI and second LSI.

8. The signal transmission apparatus according to claim 6, wherein the transmission unit is provided in first LSI, the reception unit is provided in second LSI that is different from the first LSI, the first LSI is mounted on first substrate, the second LSI is mounted on second substrate that is different from the first substrate, the first substrate and the second substrate are connected by a connector, and the transmission path comprises the connector and wires on the first substrate and second substrate.

9. The signal transmission apparatus according to claim 1, further comprising:
a plurality of circuit groups each comprising the transmission unit, the reception unit, the transmission path, the signal output unit, the network analyzer, the frequency characteristic measurement unit, the selection unit, the measurement unit, and the setting unit.

10. The signal transmission apparatus according to claim 9, wherein the transmission unit of at least one circuit group of the plurality of circuit groups is provided in first LSI, the reception unit of at least one other circuit group of the plurality of circuit groups is provided in second LSI that is different from the first LSI, and the transmission path comprises wires on a substrate mounted with the first LSI and second LSI.

11. The signal transmission apparatus according to claim 1, further comprising:
a bus provided between the transmission unit and the reception unit to communicate bidirectionally; and
a controller connected to the bus, and comprising the frequency characteristic measurement unit, the selection unit, and the setting unit.

12. A signal transmission method in a signal transmission apparatus comprising a transmission unit transmitting a sign comprising transmission signal control means for controlling an amplitude of the signal and an emphasis characteristic of the signal; a reception unit receiving the signal and comprising reception signal equalizing means for controlling an equalization characteristic of the signal; and a transmission path connecting the transmission unit and the reception unit and transmitting the signal, the method comprising:
outputting the signal from a signal output unit to the transmission path;
analyzing, at a network analyzer analyzing the signal on the transmission path, transmission and reception of the signal in the transmission path;
measuring, at a frequency characteristic measurement unit, frequency characteristics of the transmission path based on the analysis;
selecting, at a selection unit, a plurality of combinations of amplitude, emphasis characteristic, and equalization characteristic of the signal based on the frequency characteristics;
measuring, at a measurement unit, a Bit Error Rate (BER) and an eye opening of the transmission path for the plurality of combinations of amplitude, emphasis characteristics, and equalization characteristics;
extracting, at a setting unit, single combination from the plurality of combinations of amplitude, emphasis characteristics, and equalization characteristics based on the measurement of the BER and the eye opening, and setting the amplitude, the emphasis characteristic, and the equalization characteristic to the transmission unit and the reception unit;
wherein measuring the BER of the transmission path at a BER measurement unit the eye opening of the transmission path at an eye opening measurement unit;
wherein selecting one or more amplitudes satisfying a selection condition that is determined based on the frequency characteristics, selecting one or more equalization characteristics having a frequency band that is determined based on the frequency characteristics, and selecting a center value and a plurality of values above and below the center value of the selected equalization characteristic as the equalization characteristic;
wherein the frequency characteristics comprise Scattering parameters (S parameters);
wherein the determined selection condition is a condition that is defined using Differential Return Loss Scattering parameters (SDD11 parameters) defined in a model of the Scattering parameters (S parameters); and
wherein the determined frequency band is a frequency below an upper limit value of the SDD11 parameters in the model of the Scattering parameters (S parameters).

13. The signal transmission method according to claim 12, wherein:
the single combination having the largest eye opening from the plurality of combinations is extracted based on the measurement of the eye opening.

* * * * *